United States Patent [19]

Spies et al.

[11] Patent Number: 5,424,583
[45] Date of Patent: Jun. 13, 1995

[54] DEVICE FOR TRIGGERING A PASSIVE SAFETY SYSTEM

[75] Inventors: Hans Spies, Pfaffenhofen; Peter Hora, Schrobenhausen; Günter Fendt, Schrobenhausen; Kenneth Francis, Schrobenhausen; Helmut Steurer, Junkenhofen, all of Germany

[73] Assignee: Messerschmitt-Bolkow-Bolohm GmbH, Germany

[21] Appl. No.: 884,168

[22] Filed: May 18, 1992

[30] Foreign Application Priority Data

May 18, 1991 [DE] Germany .................. 41 16 336.2

[51] Int. Cl.6 ............................................ B60R 21/16
[52] U.S. Cl. .................. 307/10.1; 180/282; 280/735; 340/436
[58] Field of Search .............. 307/10.1; 280/735, 734; 180/282; 340/436, 438, 459, 669; 364/424.05

[56] References Cited

U.S. PATENT DOCUMENTS

| | | | |
|---|---|---|---|
| 4,836,024 | 6/1989 | Woehrl et al. | 73/514 |
| 5,083,276 | 1/1992 | Okano et al. | 364/424.05 |
| 5,173,614 | 12/1992 | Woehrl et al. | 307/10.1 |

FOREIGN PATENT DOCUMENTS 0311039 10/1988 European Pat. Off. .
3816588 6/1990 Germany .
3924507 8/1990 Germany .

*Primary Examiner*—A. D. Pellinen
*Assistant Examiner*—Aditya Krishnan
*Attorney, Agent, or Firm*—Evenson, McKeown, Edwards & Lenahan

[57] ABSTRACT

A device for triggering a passive safety system in a vehicle upon detection of an impact. At least two acceleration sensors, the sensitivity axes of which are aligned for detecting an angle of a frontal impact, are each assigned to a signal channel which, in series with the respective impact sensor, comprises an evaluation circuit, particularly an integrator circuit for its output signals, and a threshold value circuit. During the formation of the speed integral, the physical signal course and the course of the signal edges is evaluated by several logic units in a logical unit (LOG) in order to obtain factors which influence the integration constant of integrators (by multiplication and reduction) to enlarge the area that can be evaluated.

34 Claims, 5 Drawing Sheets

1

$$A_s = \frac{S2 + X}{S2} \quad t \leq 5\,\text{ms}$$

$$A_s = \frac{S2 - X}{S2}$$

2

$$A_s = \frac{S3 + X_{max}}{S2} \quad t_z + t \leq t_o + t_d$$

$$A_s = \frac{S3 - X_{min}}{S3} \quad t_o \ldots t_d$$

DEVICE FOR TRIGGERING A PASSIVE SAFETY SYSTEM

BACKGROUND AND SUMMARY OF THE INVENTION

This invention relates to a device for triggering a passive safety system which is installed in a vehicle and is triggered by an impact. The device has at least two acceleration sensors, the sensitivity axes of which are aligned for detecting the angle of a frontal impact. Each sensor is coupled in series with a signal channel, which comprises an evaluation circuit, particularly an integrator circuit for its output signals and a threshold value circuit.

German Patent 38 16 587 discloses a device of this type, which evaluates the signals of two acceleration sensors with cos $\phi-$ characteristics, mounted at an angle of $+\phi$ and $-\phi$ symmetrically with respect to the driving direction in the vehicle in its frontal area. The evaluation is performed such that collisions are detected which have a specific angle (angle $\phi$) to the driving direction.

It is an object of the present invention to provide a reliable triggering device in a passive safety system which has a high adaptability to any vehicle type, particularly an expandable triggering logic which permits detection and evaluation of more characteristics than previously possible.

The principal advantages of the invention are that both the physical orientation of the signal relative to at least two aligned acceleration sensors, and the temporal development of the impact are included in the evaluation of a frontal impact, including an impact obliquely from the front within a given angle range. Thus, the triggering reliability of the detector according to the invention at a desired point in time is increased as well as the reliability in identifying only those very special types of impacts, for which triggering of the passive protection system is appropriate.

The invention also has the advantage that certain additional physical phenomena are taken into account in the evaluation of the triggering logic, which can thus identify and distinguish other disturbance factors, such as:

- vehicle chassis structure (weak, flexible);
- breaking struts and columns in the vehicle;
- crumbling sheet metal of the vehicle body;
- knocking of the linkage on the vehicle;
- components that are intentionally or unintentionally movable in the case of an impact, such as bumpers, steering columns, engine block, etc.

Cases that are particularly critical among those mentioned, as additional acceleration causes, may lead to a faulty triggering of a safety system and thus to injuries of occupants.

The present invention also incorporate the improvements in the Applicant's German Patents 37 33 837 filed on the same date as the German Patent Document DE-PS 38 16 587, describing the spherical-symmetrical characteristics of at least two (preferably four) acceleration sensors oriented symmetrically to the longitudinal axis of the vehicle and in a plane, and the German Patent 38 16 588, filed on the same date, which discloses a triggering device with variable thresholds and a control device for the lowering and raising of this threshold; the principles disclosed in these patent documents are also in the evaluation logic of the present invention. The resulting important advantage is that the impact history, or time sequence, of the collision can be taken into account in that individual factors are linked with one another; as a result the integration constants can be changed.

Another particular advantage of this arrangement is that, by means of these individual (correction) factors, the sensitivity of the sensors can be utilized almost completely (100%) over a wider angle range-here toward 180°. In other words, the triggering logic according to the invention can be utilized not only in a frontal impact direction, precisely against the driving direction, in a lateral impact, precisely 90° with respect to the driving direction; and at an angle of $+$ or $-45°$ to the driving direction, but also at all intermediate angles. By adjustment of several thresholds ($-i_2$), it is thus possible to evaluate and recognize reliably, in the oblique impact area between 45° and 90° relative to the driving direction, the crash history by way of the physical signal course, with the angle recognition in the triggering logic.

Crash signal evaluation in the triggering logic according to the invention is divided into several subparts which combine to influence the physcial signal evaluation. The process includes an assessment of the "crash history" as well as of the momentary crash sequence. The instantaneous triggering time, which is a function of the forward-shifting of the driver's and front passenger's head, is determined by means of speed integrals and path integrals, as well as thresholds and reset conditions, so that a reliable triggering signal is emitted by the circuit.

The several mutually independent subparts into which the crash signal assessment is divided are as follows:

- considering the impact angle;
- considering the channel with respect to the threshold (single channel);
- considering the channel with respect to the threshold and a positive g-edge (single channel);
- considering the channel with respect to the threshold and a positive g-edge (dual channel);
- considering the channel with respect to a positive and negative g-edge (single channel);
- recognition of preceding-sign change (single channel); and
- recognition of reduced acceleration signal.

The crash direction is determined in a variable sliding time interval t, which becomes active when a crash is detected at an angle between $-45°$ and $+45°$ is measured, and remains active until either an angle outside the measuring range is determined or a period equal to $2\times t$ has transpired.

The calculated values are each set back after a fulfilling of the criteria.

Only the angle determined from the relationship of the g-signals (that is, acceleration measurements expressed in gravitational equivalents; 1 g=9.8 meters/sec$^2$) between the two sensors ml (left) and mO (right) is determined and used for the evaluation. Angle determination is performed clockwise starting from ml (right-hand system).

$$\tan \alpha = m0/ml \qquad 0° < \alpha < 45° \qquad (1)$$
$$(\alpha = \arctan m0/ml)$$

For the angle >45°, the reciprocal value of the relationship from (1) is determined.

$$\tan \alpha = Ml/m0 \quad 45° <= \alpha < 90° \quad (2)$$

This results in a value range of:

$$0° \text{ to } 45°: \tan \alpha = 0-1 \quad (1)$$

$$45° \text{ to } 90°: 1/\tan \alpha = 1-0 \quad (2)$$

This result is used for calculation of the integration variables.

During the calculation, the braking deceleration is taken into account in order to suppress an early change of the integration variables.

The result of considering the angle with its evaluation is to increase the sensor sensitivity to approximately 100% in the case of frontal impacts which, because of the sensor arrangement, would therefore be recognized only with approximately 70% of the signal amplitude.

Other objects, advantages and novel features of the present invention will become apparent from the following detailed description of the invention when considered in conjunction with the accompanying drawings.

DETAILED DESCRIPTION OF THE DRAWINGS

In order to be able to maintain the 100% sensitivity of the sensor arrangement according to the invention, the following integration factors ("IF") are introduced:

| | |
|---|---|
| IF 1 | integration factor of the angle determination |
| IF 2 | integration factor of the positive edge evaluation with the coupling of two channels (threshold) |
| IF 3 | integration factor of the counter of the exceeding of the threshold |
| IF 4.0/if 4.1 | integration factor of the positive edge evaluation with decoupling of both channels (threshold) |
| Reduce 1 | reduction of the integration factors by zero crossing |
| Reduce 2 | reduction of the integration factors by signal decay |
| integ 0, integ 1 | integration factors which finally affect the V-integration of the individual channels (m0, m1). |

Figure 1:
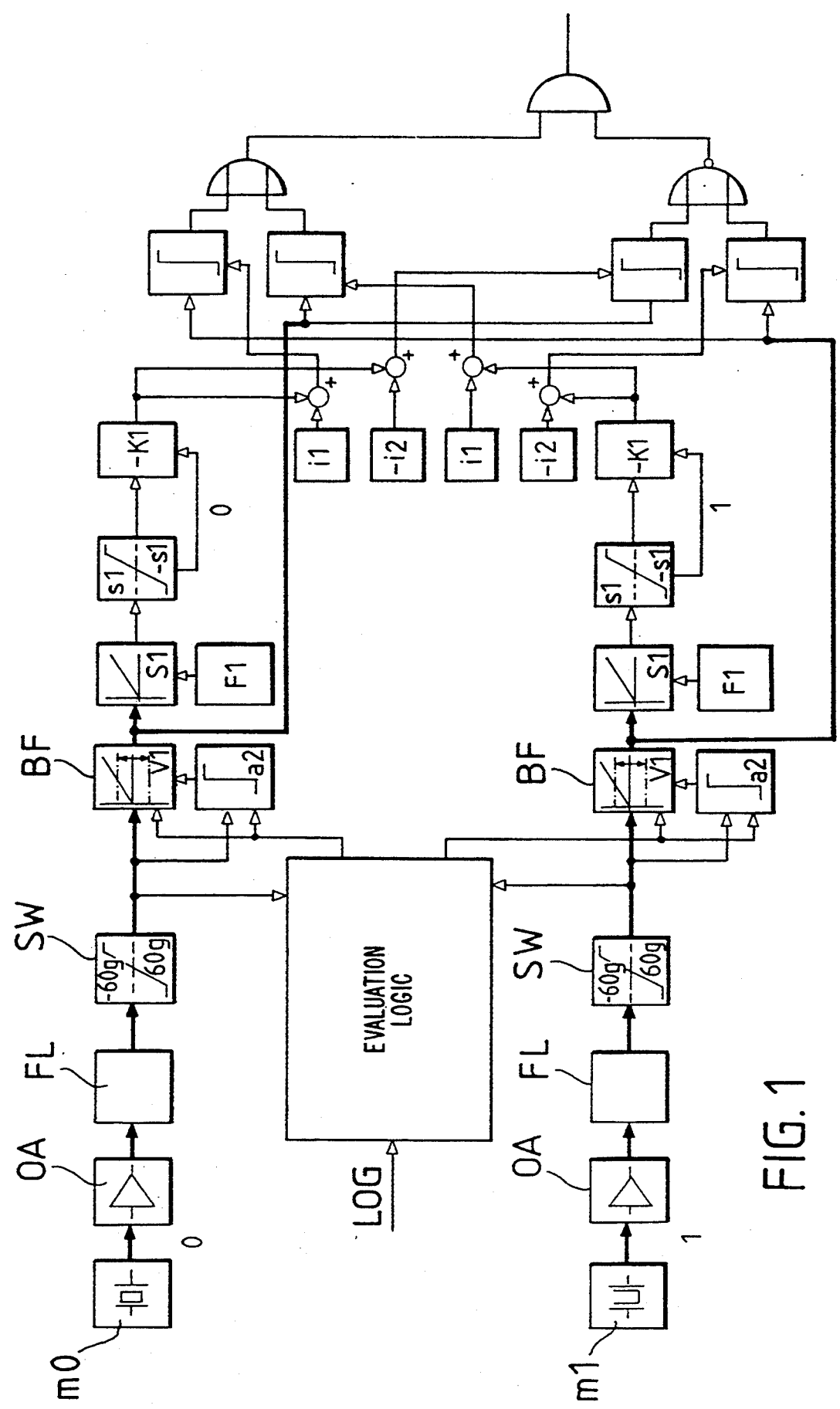
FIG. 1 is a schematic depiction of an impact detection arrangement according to the invention.

These factors are reflected in the drawings. FIG. 1 shows two sensors, mO and ml, to which channels 0 and 1 are assigned on the right and left sides respectively. The acceleration sensors are followed in series by amplifiers OA and filters FL as well as threshold value elements SW. The signals from channel 0 and channel 1 are logically combined and evaluated in the logic circuit LOG, which has two outputs 0 and 1 connected respectively with band pass filters BF and threshold value elements for the threshold value a2. The outputs of the respective band pass filters and the associated threshold value elements for a2 are fed to respective integrators S1 and their associated filters F1, correcting elements K1, signal comparators for i1 and i2 as well as the OR-circuit for possible triggering at the end, as shown in FIG. 1 on the right.

Figure 2:
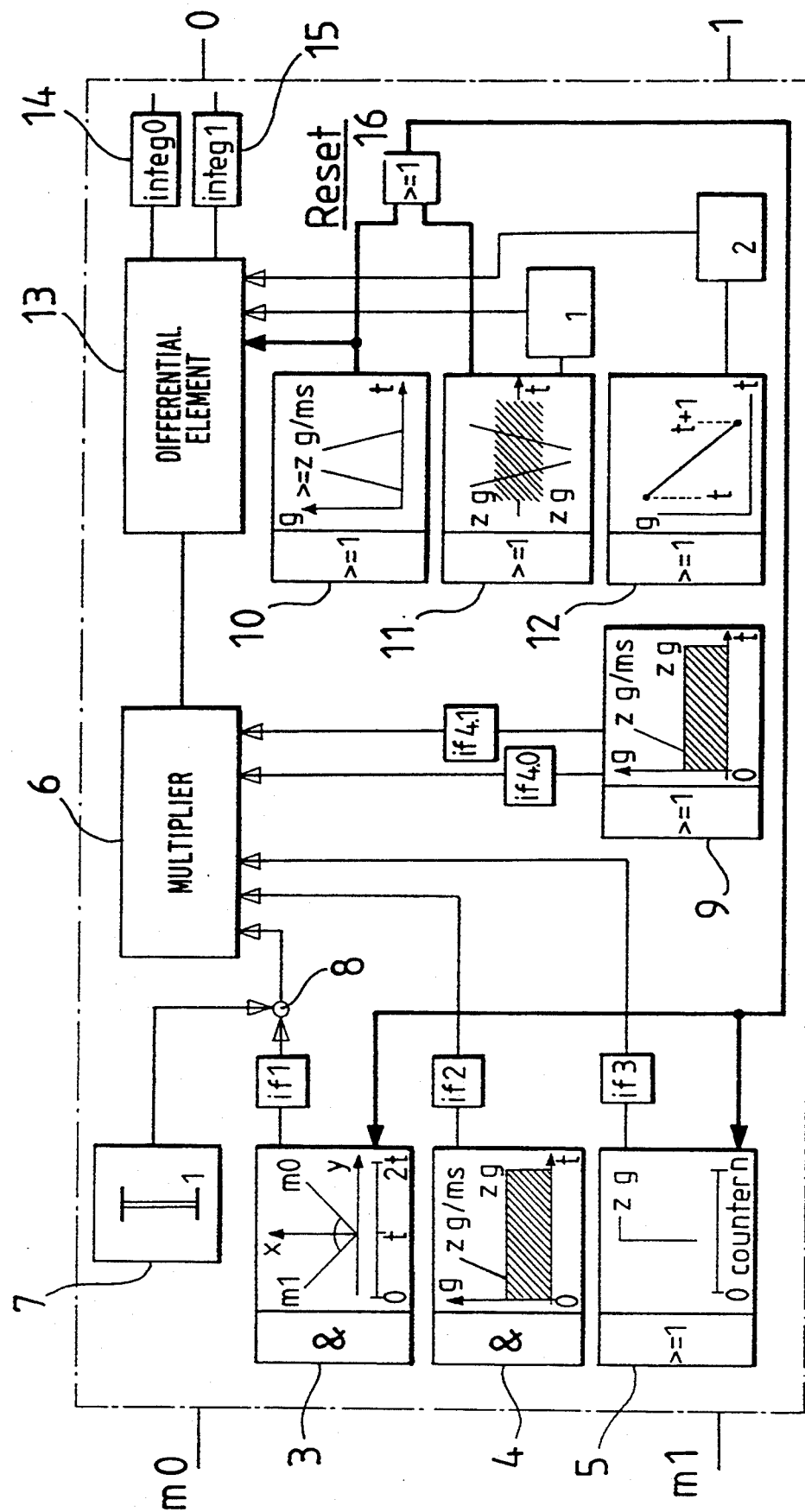
FIG. 2 is a detailed representation of the physical signal evaluation, including taking account individual factors and their linking in order to reach the above-mentioned 100% utilization of the sensitivity of the sensor arrangement (see FIG. 5)
Figure 5:
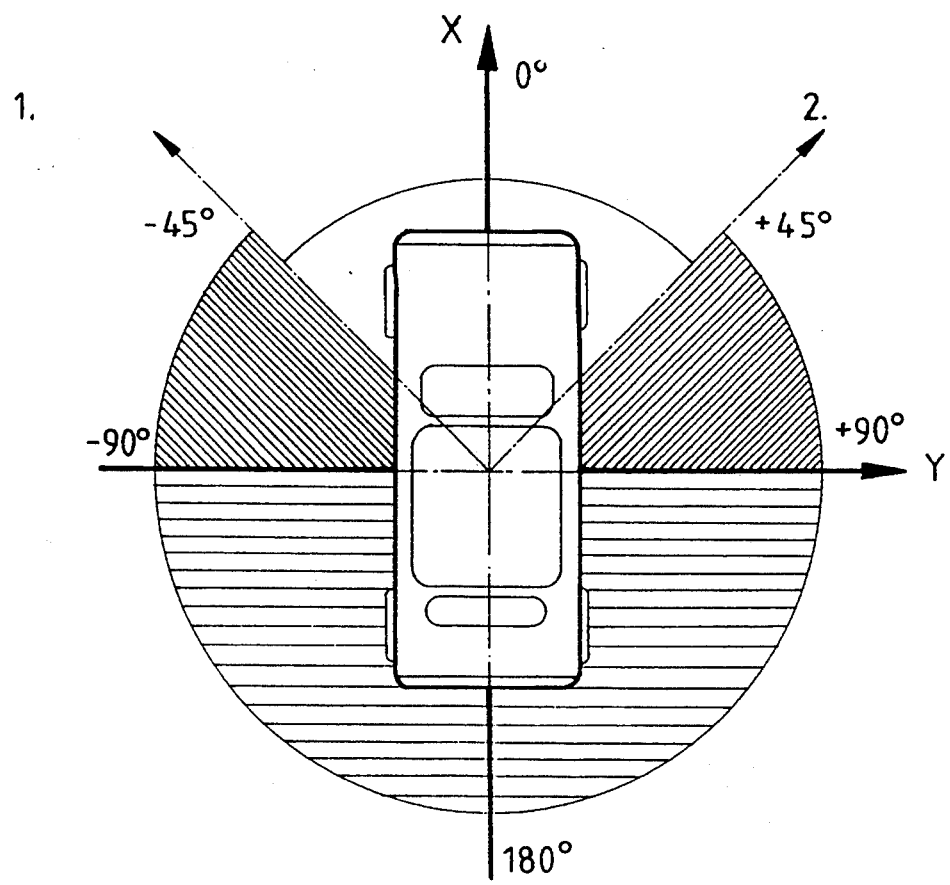
FIG. 5 is a view of a vehicle in the system of coordinates, wherein the x-axis represents the driving direction, with a first and a second sensor arranged at angles of $+\phi$ and $-\phi$ (for example at 45°) in the plane in the vehicle.

FIG. 2 shows the details of the evaluation logic LOG from FIG. 1. On the left, the signals mO and ml come from the sensors, and the outputs LOG 0 and 1 are shown on the right. Reference number 3 in FIG. 2 designates an angle evaluation in the system of coordinates according to FIG. 5 with an additional time evaluation; reference number 4 is an acceleration evaluation minus a given deceleration time, while reference number 5 indicates a counter which detects the number of decelerations which has occurred. Logic units 3 to 5 of the logic circuit are used to obtain the integration factors IF 1 to IF 3 respectively which are then multiplied in a multiplier 6. A control element 7 can also add an additional value in a summation point 8. The logical derivation of the integration factors IF 4.0 and IF 4.1 for the positive edge evaluation with the decoupling of both channels (thresholds) takes place in logical unit 9. In logic units 10, 11 and 12, duplication factors are obtained for the physical signal evaluation. In this case, the logical unit 10 takes the acceleration g into account over a given time.

In logical unit 11, for obtaining the reduction factor Reduce 1, the zero crossing of the acceleration signals is weighted in relation to a specific time period, and in logical unit 12, a signal reduction takes place between the time t and t+1 by signal decay.

The reduction of the individual factors takes place in the differential element 13 which, in turn, is connected with an integration elements 14 and 15. In addition, a reset 16 is shown in FIG. 2 on the right, which is connected with outputs of logical units 10 and 11 for the resetting of the counter 5 and of the angle evaluation element 3.

Figure 3:
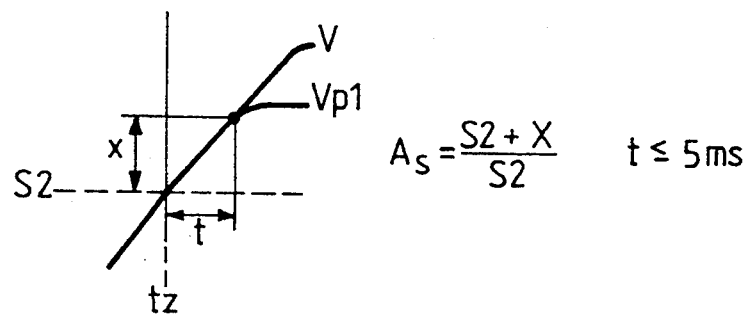
FIG. 3 is a graphic representation of the triggering algorithm according to the invention and a definition of the triggering safety by means of two criteria.
Figure 3:
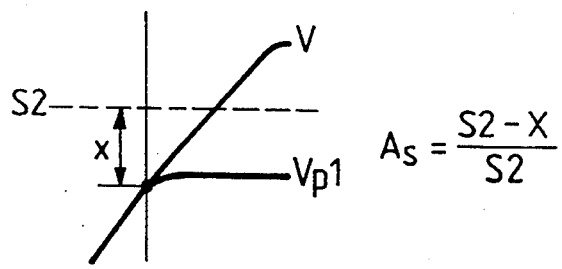
Figure 3:
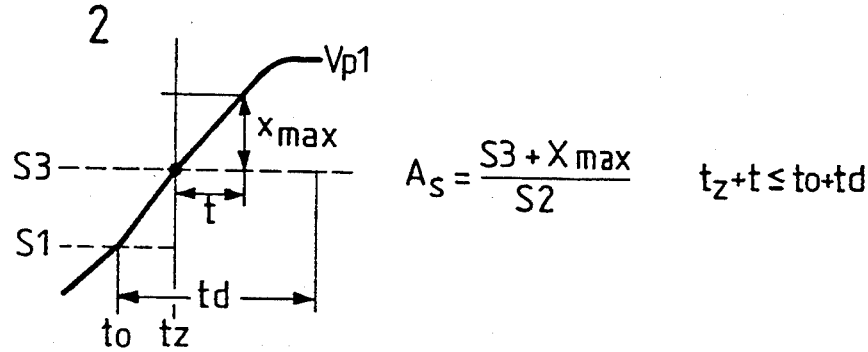
Figure 3:
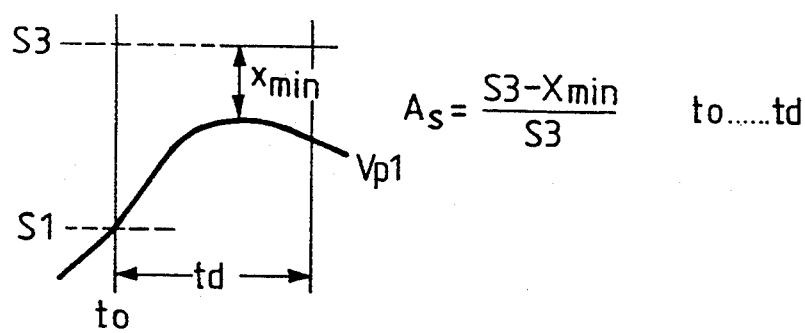
Figure 4:
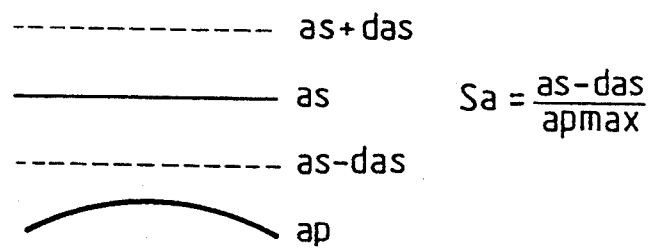
FIG. 4 is a graphic depiction of the safety factors for the threshold value adjustment for the three cases: raise thresholds; lower thresholds; and leave thresholds unchanged.
Figure 4:
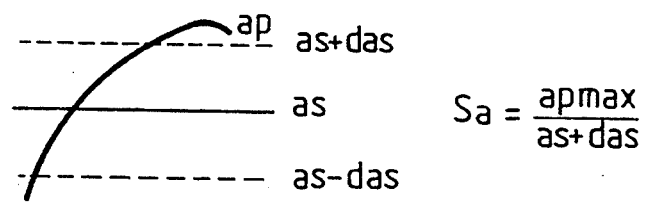
Figure 4:
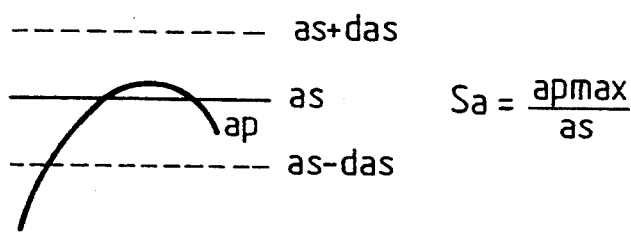

Based on the above, FIGS. 3 and 4 are clear, and a person skilled in the art knows their significance from the drawing. The same applies to FIG. 5.

Method of Operation:

Considering a channel (single channel):

The evaluation determines whether one or both acceleration values mO or ml, within an undefined time, exceed a positive threshold with a certain frequency. If this is the case, the integration variable is multiplied by the factor IF 3.

Considering a channel (single-channel correlation):

This evaluation becomes operative when the acceleration value of a channel exceeds an adjustable threshold, and has at least a certain predetermined edge steepness. When these conditions are met, the integration variable is multiplied by the factors IF 4.0, IF 4.1. In this case, no time evaluation is taken into account.

Considering a channel (dual channel):

This evaluation becomes operative when both acceleration values mO, ml exceed an adjustable threshold, and also have at least a certain predetermined edge steepness. When these conditions are met, the integration variable is multiplied by the factor IF 2. In this case, no time evaluation is taken into account.

Edge evaluation (single channel):

This evaluation processes the acceleration values mO and ml individually and is used to reset the integration variables and the counters. When the acceleration value mO or ml has a positive or negative slope which is smaller than the comparative value, the integration is stopped (integration factor=0). At the same time, the counter for the channel consideration (single channel) as well as the starting point for the time window $\Delta t$ of the angle consideration is reset.

Recognition of preceding sign change (single channel):

This evaluation becomes operative when over an adjustable range a preceding sign change occurs between two successive acceleration values, in which case the integration variables for the respective channel are reduced (Reduce 1).

Recognition of reduced acceleration signal (single channel):

This evaluation becomes operative when a sensed acceleration value is lower than the preceding value, by an adjustable factor. When such a reduction exists, the integration variables for the respective channel are reduced (Reduce 2).

Physical signal evaluation:

The physical evaluation consists essentially of the integration of speed (v) and path (s). For the further assessment of a crash, the integrals, after the adding of a fixed threshold, are compared with one another and evaluated.

Speed integral:

The v-integral integrates all g-values, the edges of which have a certain predetermined steepness in the positive as well as in the negative direction. The result of the integration is increased or decreased in value by the integration factor determined when considering the signal. The integral is reset when the input signals fall within a defined acceleration range $a_s$. Within this range, the integration factor has an accelerating effect on the resetting. The speed integral has no maximal or minimal limit values which cause a further resetting.

Path integral:

The s-integral adds up all v-values which are offered during the sequence. The integral is reduced continuously. When the v-integral is given, a resetting therefore automatically takes place at any time. When the maximum or minimum value is reached, the integral is further reduced; when there is again a falling below a lower limit value, this further reduction is decreased again. The same protection as in the case of the physical signal evaluation applies to the speed integral as well as to the path integral.

Triggering signal:

The speed integral is compared with the sum which is composed of a constant and the evaluated path integral (=of the threshold shifting which is divided into small grids) and, when this sum is exceeded forms the triggering signal. This triggering signal is formed separately for both channels. However, a triggering actually occurs only when both of the two channels fall below or exceed maximum and minimum limit values.

In the case of safety systems, such as passive restraint systems in vehicles, the application of the invention is particularly well suited for the triggering of a protection device, such as an air bag, a belt tightener, a rollover safety bar and other similar systems. For example, an air bag can be provided and triggered for the driver, another air bag can be provided and triggered for the front seat passenger if permitted by the evaluation, by means of the triggering logic according to the invention. In addition, belt tighteners or similar systems may also be activated for occupants in the front seats as well as in the rear seats. At the same time, lateral air bags may also be triggered, which are provided, for example, in the doors of a vehicle or at the roof on the interior side in the frontal area close to the windshield in order to offer an additional protection for the head and/or a rollover protection. In addition, safety systems and system components of the same or of a similar type for different parts of the body, for example, for protecting the knee or leg or for protecting the arms, or for similar purposes, may also be provided.

A person skilled in the art may modify the above-mentioned embodiment without leaving the scope of the invention. In particular, such modifications also include combinations with the circuits and switching elements from the German Patents 37 33 837, 38 16 587 to 38 16 591.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for triggering a vehicle safety system of a vehicle upon detecting of an impact comprising:
    at least two acceleration sensors having sensitivity axes which are oriented to detect an angle of a frontal impact;
    at least two signal channels for processing acceleration signals generated by said acceleration sensors, one of said signal channels being connected to each of said acceleration sensors, each of said signal channels having an acceleration signal evaluation circuit for forming a speed signal, and a threshold value comparator circuit;
    logic means, coupled to receive said acceleration signals, for evaluating a time sequence of said acceleration signals including edges thereof, during an impact, and for generating integration factors;
    at least two integrators, each being coupled to receive outputs from said logic means; and
    means responsive to said integration factors for adjusting an integration constant and applying said integration constant to each of said at least two integrators.

2. Apparatus according to claim 1, wherein the logic means has a variable triggering threshold that is a function of both a constant and a variable of integration.

3. Apparatus according to claim 2, wherein, when the speed signal is formed only by acceleration values which exceed a defined slope are determined.

4. Apparatus according to claim 2, wherein the integrators use variable integration constants to form an integral.

5. Apparatus according to claim 2, wherein the integration constant is determined as a function of a combination of thresholds and edge steepness of the edges of said acceleration signals.

6. Apparatus according to claim 2, wherein the integration constant is determined as a function of successive acceleration values.

7. Apparatus according to claim 1, wherein the integration constant is a function of an angle at which the vehicle impacts an object.

8. Apparatus according to claim 7, wherein when the speed signal is formed only by acceleration values which exceed a defined slope are determined.

9. Apparatus according to claim 7, wherein during the determination of said angle by said logic means, an acceleration signal time window of a selected length is used by said logic means.

10. Apparatus according to claim 1, wherein, when the speed signal is formed only by acceleration values which exceed a defined slope are determined.

11. Apparatus according to claim 10, wherein variable integration constants form an integral.

12. Apparatus according to claim 1, wherein the integrators use variable integration constants to form an integral.

13. Apparatus according to claim 12, wherein the integration constant is determined as a function of a combination of thresholds and edge steepness of the edges of said acceleration signals.

14. Apparatus according to claim 12, wherein the integration constant is determined as a function of successive acceleration values.

15. Apparatus according to claim 1, wherein the integration constant is determined as a function of a combination of thresholds and edge steepness of the edges of said acceleration signals.

16. Apparatus according to claim 1, wherein the integration constant is determined as a function of successive acceleration values.

17. Apparatus for triggering a vehicle safety system of a vehicle upon detection of an impact comprising:
at least two acceleration sensors having sensitivity axes which are oriented to detect an angle of a frontal impact;
at least two signal channels for processing acceleration signals generated by said acceleration sensors, one of said signal channels being connected to each of said acceleration sensors, each of said signal channels having an acceleration signal evaluation circuit for forming a speed signal, and a threshold value comparator circuit;
logic means, coupled to receive said acceleration signals, for evaluating a time sequence of said acceleration signals including edges thereof, during an impact, and for generating integration factors;
at least two integrators, each being coupled to receive outputs from said logic means;
means responsive to said integration factors for adjusting an integration constant and applying said integration constant to each of said at least two integrators; and
wherein instead of the integration constant, the acceleration signal is varied.

18. Apparatus for triggering a vehicle safety system of a vehicle upon detection of an impact comprising:
at least two acceleration sensors having sensitivity axes which are oriented to detect an angle of a frontal impact;
at least two signal channels for processing acceleration signals generated by said acceleration sensors, one of said signal channels being connected to each of said acceleration sensors, each of said signal channels having an acceleration signal evaluation circuit for forming a speed signal, and a threshold value comparator circuit;
logic means, responsive to said acceleration signals, for evaluating said acceleration signals during an impact in order to generate integration factors that vary according to time, direction, force and duration of said impact;
at least two integrators, each being coupled to receive outputs from said logic means;
one or more devices responsive to said integration factors for setting an integration constant applied to said integrators, and triggering means which vary the time between said impact and triggering of the safety system according to the integration constant.

19. Apparatus according to claim 18, wherein the logic means has a variable triggering threshold that is a function of both a constant and a variable of integration.

20. Apparatus according to claim 19, wherein, when the speed signal is formed only by acceleration values which exceed a defined slops are determined.

21. (Once Amended) Apparatus according to claim 19, wherein the integrators use variable integration constants to form an integral.

22. Apparatus according to claim 19, wherein the integration constant is determined as a function of a combination of thresholds and edge steepness of the edges of said acceleration signals.

23. Apparatus according to claim 19, wherein the integration constant is determined as a function of successive acceleration values.

24. Apparatus according to claim 18, wherein the integration constant is a function of an angle at which the vehicle impacts an object.

25. Apparatus according to claim 24, wherein, when the speed signal is formed only by acceleration values which exceed a defined slope are determined.

26. Apparatus according to claim 24, wherein during the determination of said angle by said logic means, an acceleration signal time window of a selected length is used by said logic means.

27. Apparatus according to claim 18, wherein, when the speed signal is formed only by acceleration values which exceed a defined slope are determined.

28. Apparatus according to claim 27, wherein the integrators use variable integration constants to form an integral.

29. Apparatus according to claim 18, wherein the integrators use variable integration constants to form an integral.

30. Apparatus according to claim 29, wherein the integration constant is determined as a function of a combination of thresholds and edge steepness of the edges of said acceleration signals.

31. Apparatus according to claim 29, wherein the integration constant is determined as a function of successive acceleration values.

32. Apparatus according to claim 18, wherein during the determination of an impact angle $\alpha$, an acceleration signal time window of a selected length is used.

33. Apparatus according to claim 18, wherein the integration constant is determined as a function of a combination of thresholds and edge steepness of the edges of said acceleration signals.

34. Apparatus according to claim 18, wherein the integration constant is determined as a function of successive acceleration values.

* * * * *